Feb. 14, 1933.   G. D. ATWOOD   1,897,227

SPOOL

Filed Feb. 14, 1930

Inventor
George D. Atwood
By his Attorneys

Patented Feb. 14, 1933

1,897,227

UNITED STATES PATENT OFFICE

GEORGE D. ATWOOD, OF BROOKLYN, NEW YORK

SPOOL

Application filed February 14, 1930. Serial No. 428,274.

This invention relates to a spool.

It is an object of the invention to provide a spool which may fit a circular or a non-circular spindle for frictional or positive drive.

It is a further object of the invention to provide a spool of metal, of cheap and economical construction, and of a character such that material is wound thereon smoothly, circularly and without bulges.

With these general objects in view, the invention consists in the features, arrangements and details of construction which will first be described in connection with the accompanying drawing and then more particularly pointed out in the appended claim.

Figure 1:
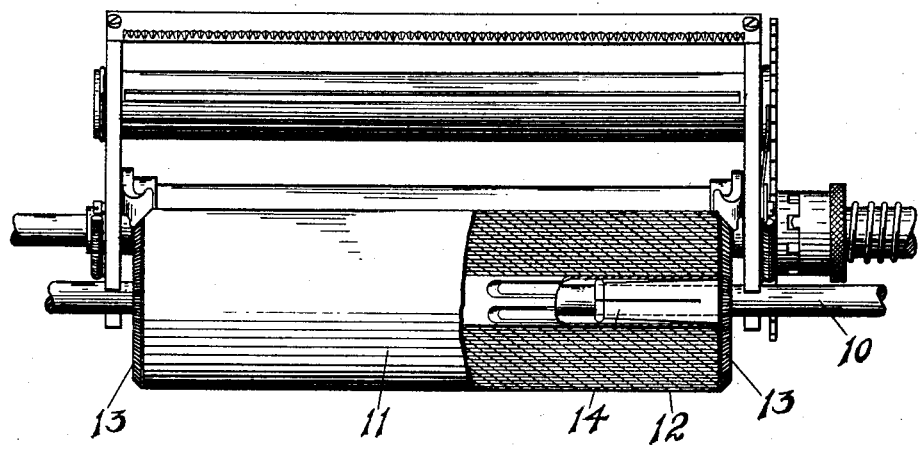
Figure 1 is an elevational view, partly in section, of a known winding mechanism having a spool constructed in accordance with the present invention.

In the drawing, a spool constructed in accordance with the invention is shown applied to a known winding mechanism (Figure 1). This mechanism comprises a spindle shaft 10 on which is disposed the spool 11 which, as here shown, has thereon a roll 12 of paper or the like. Flanges 13 are disposed on the shaft and against the ends of the tube to give side support to the roll. These flanges have split resilient spindle sleeves 14 inserted inside the spool ends and pressing outwardly to provide frictional engagements with the spool to be driven thereby. As the rest of the mechanism is not related to the invention, no detailed description is given.

A spool constructed in accordance with the invention is adapted to be used on a circular or round spindle, such as provided by sleeves 14 for frictional drive, and it is also adapted to be disposed on a non-circular or multi-sided spindle and to interlock with the sides of the spindle for positive drive. To this end, a spool is provided which is in the form of a metallic cylindrical tube having a flat projection or projections extending inwardly or interiorly of the tube, said projections being formed by indenting the outside wall of the tube inwardly and designed to fit the sides of a multi-sided spindle. In order that the paper or other material may be wound smoothly and circularly on the spool without bulges, the circumference of the spool is made uniform throughout. This result is obtained by arranging the inward projections circularly with curved regions connecting adjacent projections and having the same radii as that of the tube, and by designing the regions and projections to have substantially the same perimeter as the tube.

Figure 2:
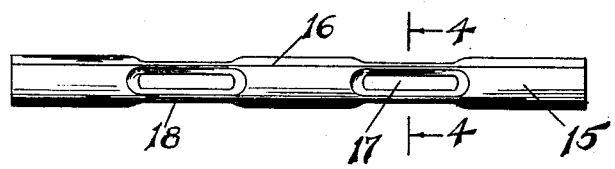
Figure 2 is an isolated elevational view of one embodiment of the spool.
Figure 4:
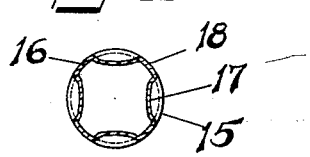
Figure 4 is a transverse sectional view taken as on line 4—4 of Fig. 2.

The spool shown as an example in Figures 2 and 4 comprises the metallic cylindrical tube 15 which may be longitudinally split as at 16 or circularly continuous. The metal of this tube is indented inwardly at two portions of the tube length which, in this embodiment, are spaced substantially equally from the tube ends. The indentations provide interiorly extending flat projections 17. As here shown, the projections are circularly arranged in groups of four to fit a square spindle, this number being optional and depending on the number of sides of the spindle to be fitted. Curved regions 18 connect adjacent projections. The regions have radii equal to the radius of the tube whereby the exteriors of said regions form smooth continuations of the outside tube surface and provide, in effect, for winding purposes, a uniform spool circumference. The perimeters of the indented portions are designed substantially equal to that of the circular tube portion to avoid bulges and provide smooth circular winding thereon.

As already explained, this spool may be fitted on a square spindle which is engaged on its sides by the flat inward projections to give a positive drive by the spool. It may also be used with a circular or round spindle such as the spindle sleeves of Figure 1 which fit in the circular bores at the ends. This embodiment is characterized by its small circumference which is the smallest possible for a given circular spindle and which is advantageous in keeping the size of the roll to a minimum.

Figure 3:
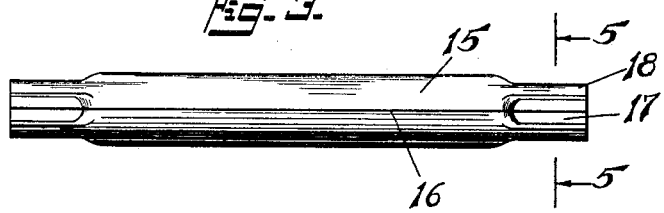
Figure 3 is an isolated elevational view of another embodiment of the spool.
Figure 5:
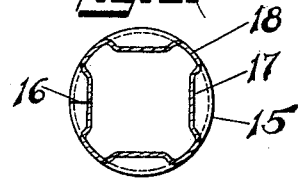
Figure 5 is a transverse sectional view taken as on line 5—5 of Fig. 3.

In the embodiment shown in Figures 3 and 5, the interiorly extending projections are similar to those described but are arranged at the extreme tube ends so that non-circular bores occur at these ends. In this case, the round spindle elements fit within the non-circular portions, being in effect inscribed within said portions. The outside of this spool is considerably larger than the former spool and the paper roll assumes larger size.

These spools are formed as tubes which are placed in dies for stamping out the indentations defining the inward projections. The tubes, being of metal, are relatively cheap and the spools can be made at a low cost.

What is claimed is:

A spool comprising a metallic cylindrical tube having at one portion of its length indentations forming interiorly extending flat spindle-engaging projections arranged circularly and curved regions between adjacent projections, said curved regions having substantially the same radius as the tube, said tube having substantially equal perimeters at its circular and non-circular portions.

In testimony whereof, I have hereunto set my hand.

GEORGE D. ATWOOD.